United States Patent [19]

Lipp

[11] 4,362,136

[45] Dec. 7, 1982

[54] INTERNAL COMBUSTION ENGINE PISTON

[75] Inventor: Stefan Lipp, Neuhausen, Fed. Rep. of Germany

[73] Assignee: Mahle GmbH, Stuttgart, Fed. Rep. of Germany

[21] Appl. No.: 341,017

[22] Filed: Jan. 20, 1982

Related U.S. Application Data

[63] Continuation-in-part of Ser. No. 88,586, Oct. 26, 1979, abandoned.

[30] Foreign Application Priority Data

Nov. 14, 1978 [DE] Fed. Rep. of Germany ....... 2849276

[51] Int. Cl.$^3$ .............................................. F02F 3/02
[52] U.S. Cl. .................................. 123/193 P; 92/159
[58] Field of Search ..................... 123/193 R, 193 P; 92/158–160, 181, 182, 177

[56] References Cited

U.S. PATENT DOCUMENTS

| 1,514,022 | 11/1924 | Smith | 92/177 |
| 2,845,917 | 8/1958 | Laubender | 123/193 P |
| 3,759,148 | 9/1973 | Geffroy | 92/160 |

Primary Examiner—Craig R. Feinberg
Attorney, Agent, or Firm—Murray and Whisenhunt

[57] ABSTRACT

A piston for medium-speed internal combustion engines having a ring groove for receiving a compression piston ring. The upper and lower flanks of the ring groove when the engine is cold deviate from a plane-parallel position in relation to the adjoining upper and lower flanks respectively of the ring to such an extent that under the mechanical and thermal loading of the combustion gases in operation of the engine under rated load they are deformed into a position plane-parallel with the flanks of the ring.

2 Claims, 3 Drawing Figures

INTERNAL COMBUSTION ENGINE PISTON

This application is a continuation-in-part application claming priority of U.S. in Pat. application Ser. No. 88,586 filed Oct. 26th 1979 now abandoned.

BACKGROUND OF THE INVENTION

The invention relates to ring grooves of a piston for medium-speed internal combustion engines to accommodate compression piston rings.

STATEMENT OF PRIOR ART

In pistons of large medium-speed engines the groove flanks of the compression ring grooves, especially the upper flank of the ring groove nearest to the piston crown, are deformed during running of the engine by reason of the mechanical and thermal stresses which the combustion gases exert upon the piston. In the ring groove nearest to the piston crown this leads to displacement of the ring groove upper flank on the outer circumference of the piston towards the lower ring groove flank. Thus in the working condition the groove height decrease in comparison with the cold condition. Here the groove height decreases most at the circumference of the piston. Towards the groove bottom the reduction of distance becomes less. At the groove bottom itself the groove distance remains practically unchanged, apart from a variation of length caused by thermal expansion.

The described variation of groove width in engine operation is known and is taken into account nowadays in the design of the groove height. Thus in practice the groove clearance is designed so that despite a deformation of the ring groove flanks leading to groove narrowing in running of the engine the piston ring possesses the freedom of movement necessary to fulfil its function. The groove clearance is thus increased by the amount by which the groove flank interval reduces most over the radial extent of the ring groove. This has the consequence that the groove height must be determined according to the conditions at the external circumference of the ring groove. This results in considerable disadvantages. If firstly one merely considers the upper ring groove flank, the following conditions result. In the case of a ring groove of rectangular form in the cold condition in running of the engine the ring groove uppr flank, considered from the groove bottom, inclines towards the lower flank in such a way that the variation of interval increases continuously radially outwards from the groove bottom. Thus between the upper flank of the ring and the upper flank of the ring groove there forms a gap similar to a triangle in the longitudinal section of the piston, with gap height decreasing radially outwards from the groove bottom. This has two essential disadvantages. In engine operation at the upper groove flank the ring does not rest on the whole area of the upper annular flank, but only in each case in linear form on the external circumference of this flank. Due to the linear contact in this region increased wear occurs on the ring and the ring groove flank. Even if damage to the ring itself can be avoided, an undesiredly rapid removal of material occurs on the ring groove upper flank which causes an increase of clearance and thus results in a premature knocking out of the ring groove. A further disadvantage consists in that the radially inwardly extending gap widening between the upper flank of the ring groove and the upper flank of the ring leads in engine operation to a constriction of the gases which are to be conducted to behind the piston ring to increase the pressure charging of the piston ring. The constriction here effects a throttling of the gases which again causes a time delay and a reduction of amount of the achievable gas pressure in the groove bottom behind the ring. Thus the function of the piston ring on the engine cylinder wall and groove lower flank as regards sealing is negatively influenced in each case.

OBJECT OF THE INVENTION

Starting from this situation the invention is based upon the problem of designing the groove height in the cold condition of the piston so that at normal running rate of the engine, at which medium-speed engines are operated for most of the time, an optimum clearance is established between ring and groove which is constant over the entire radial length of the ring groove. This is intended to avoid the provision of a greater clearance than is desired for optimum engine working, in any region of the ring groove.

SUMMARY OF THE INVENTION

This problem is solved by a design of the ring groove flanks in which the upper and lower flanks of the ring groove when the engine is cold deviate from a plane-parallel position in relation to the adjoining upper and lower flanks respectively of the ring to such an extent that under the mechanical and thermal loading of the combustion gases in operation of the engine under rated load they are deformed into a position plane-parallel with the flanks of the ring.

The form to be applied in the individual case to the ring groove flanks, following this instruction, must be ascertained experimentally by model experiments or by calculations. The methods for this are familiar to the person acquainted with the art of the piston. In the prior art in fact ring grooves for rings of rectangular section, the groove flanks of which in the cold condition do not extend plane-parallel with the flanks of the ring, are known from U.S. Pat. No. 3,759,148 and G.B. Pat. No. 1,224,286 which pertain to the same patent family. This embodiment however is not comparable with that according to the invention, since there the shape deviation is to be retained even in the working condition and specifically then. The radially outwardly widening gap between ring and ring groove provided in those ring grooves is in fact intended specifically in operation of the engine to have the effect tfhat compression gases can pass especially securely to the upper flank of the ring, so that the ring achieves an optimum seal function by pressing against the lower groove flank. For this purpose the ring clearance at the circumference of the ring groove is deliberately made greater than in the region of the groove bottom.

Figure 1:
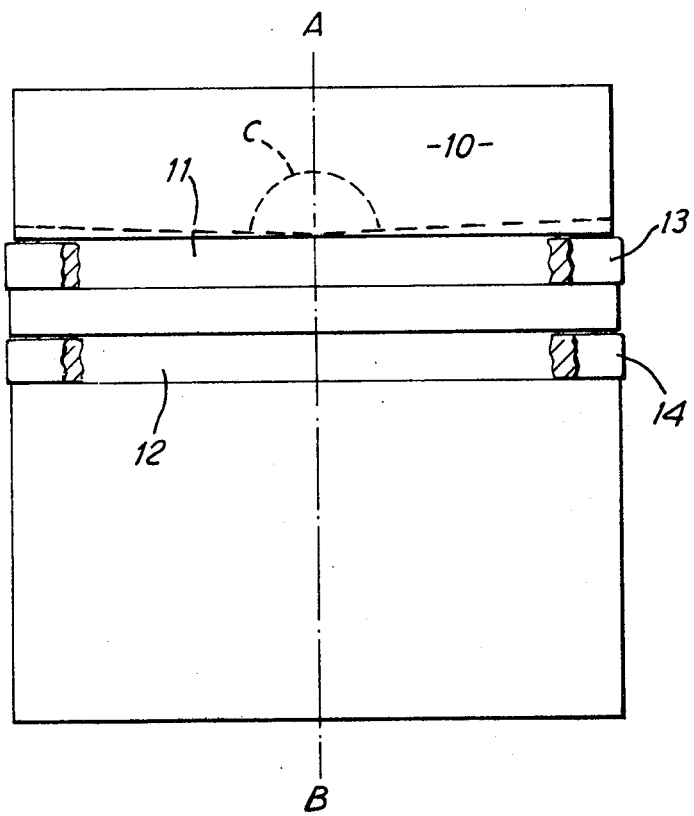
FIG. 1 is an elevational view of a piston to which the invention may be applied.

The piston 10 is an aluminium base alloy piston of cylindrical form having two piston ring grooves 11,12 containing piston rings 13,14. The grooves have a height which provides a slight clearance for the rings both in the hot and cold conditions of the piston. The piston may have one, two or more grooves and rings. The cylinder wall is shown at 4 in FIG. 2.

For the purpose of the present invention the upper groove 11 has a special formation. The upper and lower flanks of the other groove or grooves may be made parallel to the rings i.e. in planes parallel to each other and at right angles to the vertical centre line A-B of the piston.

The piston has a slightly less diameter above the groove 11 than below it so as to leave a slightly greater radial clearance 17 above the groove than the clearance 18 below the groove.

Figure 2:
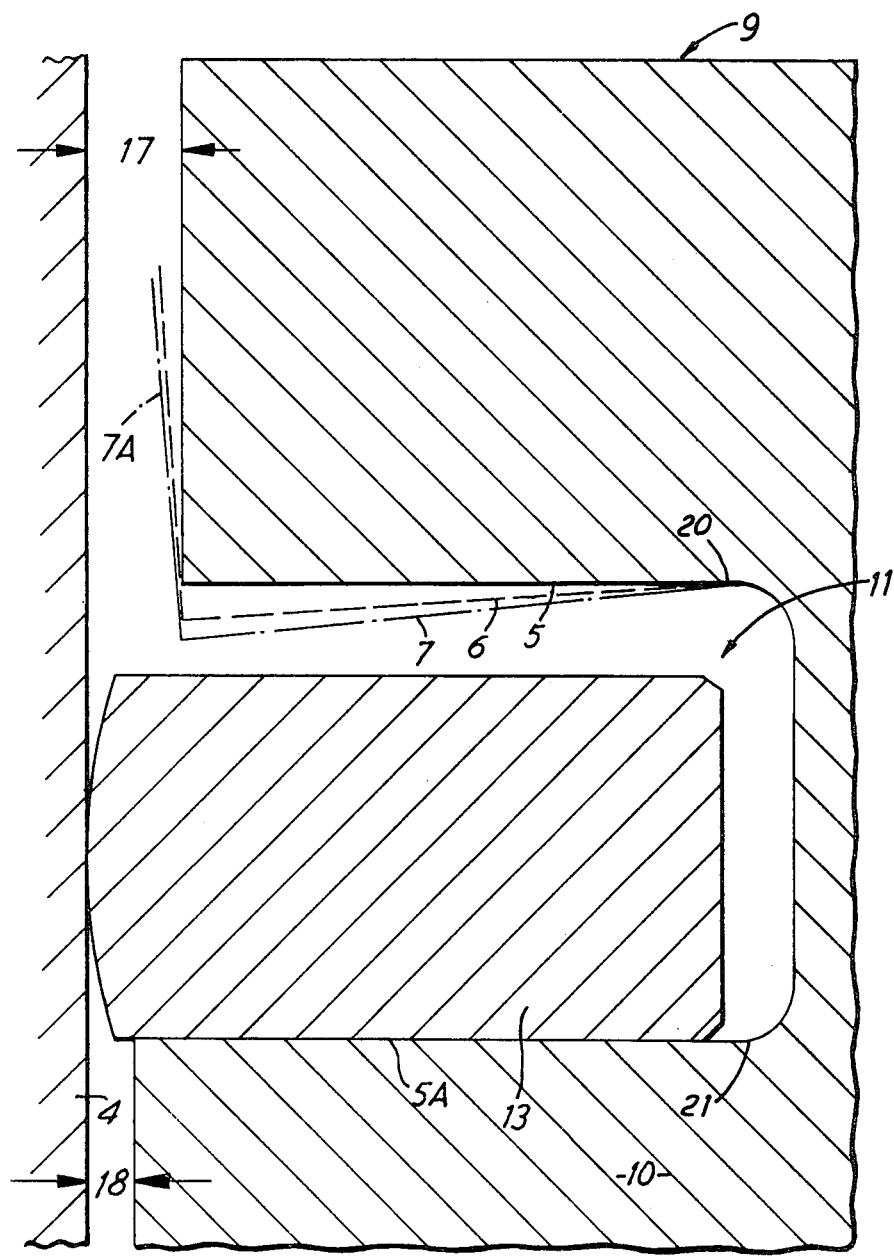
FIG. 2 is a vertical sectional view through the upper ring groove of a piston of the prior art.

The upper and lower flanks of a previously known normal type of piston are also in planes at right angles to the centre line A-B as shown by the solid lines 5 and 5A in FIG. 2. The chain line 6 shows the influence of the rise in temperature in normal operation of the engine upon the upper flank and the dot and dash line 7 reproduces the corresponding variation of form of the groove under the simultaneous influence of the thermal and mechanical forces of the combustion gases in normal engine working. The dot and dash line 7A shown the corresponding deformation of the adjacent outer surface of the piston.

Figure 3:
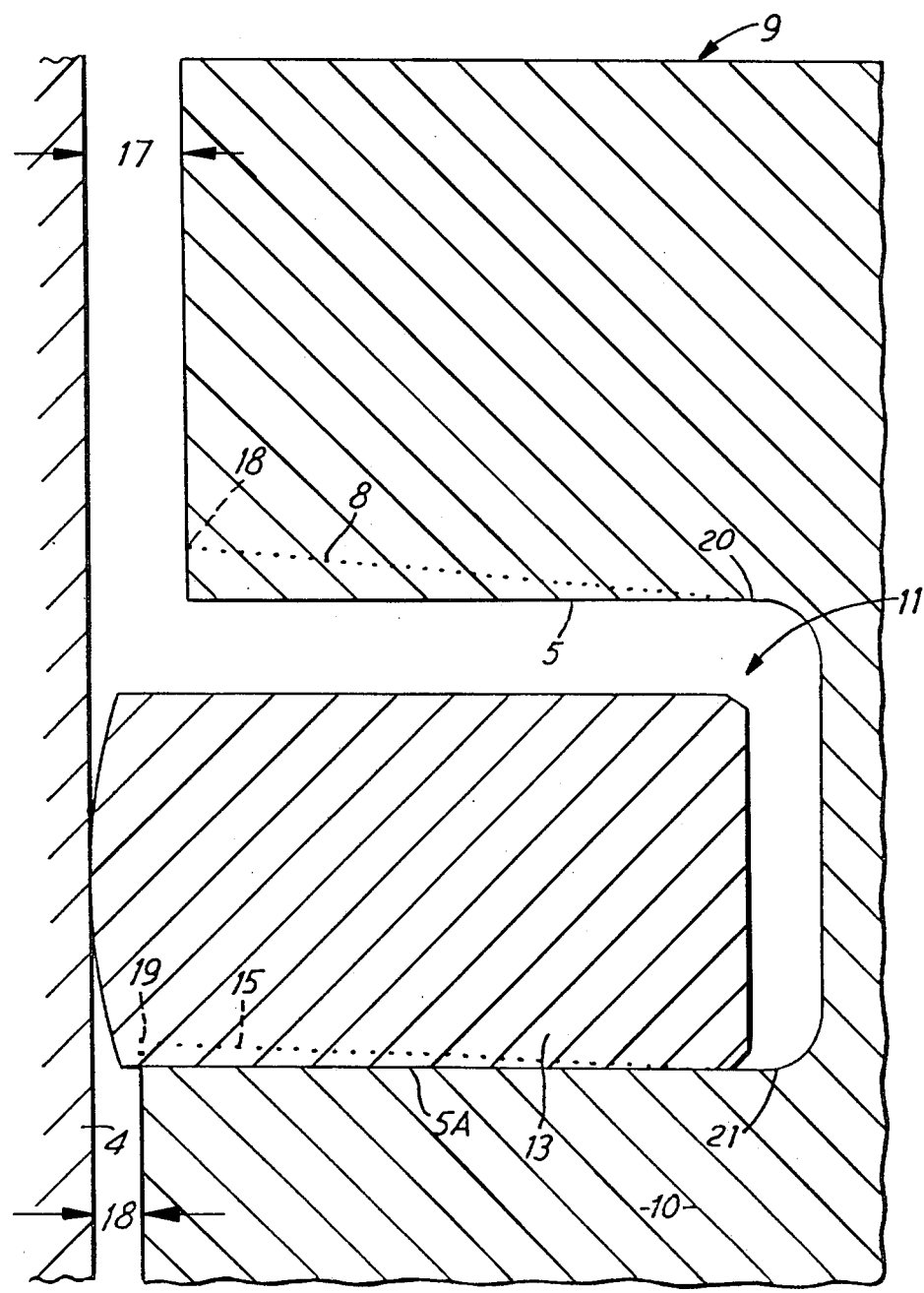
FIG. 3 is a vertical sectional view through the upper ring groove of the preferred embodiment of the present invention.

Now in accordance with the invention as shown in FIG. 3 in the cold condition the upper flank of the upper ring groove 11 is given a form according to the dotted line 8 which considered in relation to the line 5 extends in mirror image to the line 7 of FIG. 2. In other words the upper flank is conical with a cone angle selected according to practical experiment according to the type of engine and piston such that under normal working conditions of the engine the flank becomes parallel to the ring and at right angles to the vertical centre line of the piston.

The same procedure can be adopted for the lower flank of the ring groove. In view of the fact that the lower flank is deformed towards the piston foot by the thermal and mechanical loading by the combustion gases in operation of the engine, in the cold condition this flank must be deformed towards the piston crown decreasingly from the external circumference towards the groove bottom, so that in normal operation the desired plane-parallelism with the piston ring establishes itself.

Thus the upper flank in the cold condition will be conical as shown at 8 with a smaller cone angle about the piston axis A-B than the cone angle of the lower flank 15.

In section it will be seen that the upper and lower flanks of the groove 11 diverge from one another in the cold condition, with their outer edges 18,19 further apart than their inner corners 20,21 and the flanks converge towards each other as temperature and load conditions are approached under working conditions.

The cone angle C of the upper flank is indicated by the broken lines in FIG. 1 in exaggerated form. This angle C is smaller than the corresponding cone angle of the lower flank.

In the normal hot working condition of the engine, the upper and lower flanks of the upper groove assume the positions shown at 5,5A i.e. at right angles to the vertical centre line of the piston and parallel to the upper and lower surfaces of the piston ring 13 with a clearance 22 of constant height difference between the groove and the piston ring. This height difference or clearance is of course shown much exaggerated in FIG. 3 to assist clarity of drawing.

I claim:

1. A piston for an internal combustion engine having a crown at its upper end and an annular groove in the surface of its outer circumference for receiving a piston ring to be located in said groove, said groove having a generally axially extending inner wall joining together an upper flank and a lower flank, the upper flank being closer to the crown of the piston than the lower flank, said upper and lower flanks being manufactured at angles such that, in a cold condition of the piston:
   (a) the upper flank is angled radially upwardly, and has its outer edge located above a region formed by the upper flank meeting the inner wall,
   (b) the lower flank is angled radially upwardly, and has its outer edge located above a region formed by the lower flank meeting the inner wall
   (c) the angle of the upper flank is smaller than that of the angle of the lower flank is relation to the piston axis so that the outer edges of the flanks are further apart than their inner corners.
   (d) the angles of the flanks are such that under normal hot running conditions in an engine the flanks both assume positions substantially in planes at right angles to the piston axis.

2. A piston for an internal combustion engine comprising a cylindrical piston body having a crown at its upper end and provided with a plurality of annular piston ring grooves in its outer circumferential surface and a piston ring in each of the grooves, the piston above the upper groove having a less diameter than that of the piston below the upper groove, said upper groove having upper and lower flanks a piston ring located in the upper groove, said piston ring having upper and lower surfaces at right angles to the vertical centre line of the piston, said upper and lower flanks of the upper groove in a cold condition extending radially upwardly, at such angles that in vertical section an outer edge of each flank is nearer to the piston crown than a respective region formed by the respective flank meeting a generally axially extending inner wall joining the flanks together, the angle of the upper flank to a center line going through the piston being smaller than the angle of the lower flank to the piston centre line, the angles of the flanks of a upper groove being made such that in the normal hot working condition of the engine these flanks become substantially at right angles to the piston centre line and parallel to the upper and lower surfaces of the piston ring with a clearance of constant height from the piston ring.

* * * * *